March 20, 1962  R. LILJEBLAD ETAL  3,026,256
CONSTRUCTION OF THE DISTRIBUTING AND COLLECTING
VESSELS FOR THE COOLING MEDIUM IN
HETEROGENEOUS NUCLEAR REACTORS
Filed March 21, 1958  5 Sheets-Sheet 1

Inventors
Ragnar Liljeblad and
Kristian Dahl Madsen
By [signature]
Attorney.

Inventors
Ragnar Liljebad and
Kristian Dahl Madsen
By
Attorney.

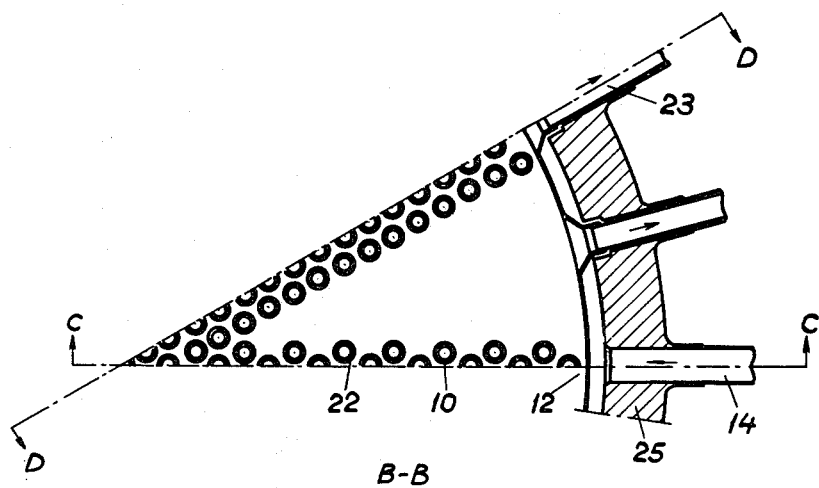

3,026,256
CONSTRUCTION OF THE DISTRIBUTING AND COLLECTING VESSELS FOR THE COOLING MEDIUM IN HETEROGENEOUS NUCLEAR REACTORS
Ragnar Liljeblad and Kristian Dahl Madsen, Vasteras, Sweden, assignors to Allmanna Svenska Elektriska Aktiebolaget, Vasteras, Sweden, a corporation of Sweden
Filed Mar. 21, 1958, Ser. No. 722,951
Claims priority, application Sweden Apr. 23, 1957
6 Claims. (Cl. 204—193.2)

Nuclear reactors of the pressure tube type may be provided with straight pressure tubes for the fuel elements which tubes extend at one end of the reactor, into a distributing vessel and at the other end into a collecting vessel. Another embodiment is that the distributing vessel and the collecting vessel are placed on the same side of the reactor.

The first mentioned embodiment requires that all tubes have approximately the same temperature or are provided with complicated expansion means, otherwise differences in the tension of the tubes would occur. Another condition is a structural material for the tubes which is very stable against corrosion and creeping since it is rather difficult to change the pressure tubes.

The other embodiment, in which the cooling medium streams in opposite directions in the pressure tubes has none of these drawbacks because the tubes are fixed to the vessels at one end only. In this case, however, the problem arises that radial tension differences occur in the assembled warm and cold collecting vessels.

The present invention relates to a construction according to the last mentioned alternative in which the radial tension differences are eliminated in a comparatively simple manner.

The general feature of the invention is that the cover and bottom of the distributing vessel for the incoming cold cooling medium are held together by bushings which are inserted in openings for the fuel elements and that the collecting vessel for the outgoing warm cooling medium is placed in said distributing vessel and supported by the said bushings and inwardly provided with a heat insulating coating.

The warm collecting vessel is thus mounted in the cold distributing vessel and provided with inner heat insulation. The construction material of the wall of the collecting vessel will thus get approximately the same temperature as the cooling medium in the cold vessel.

The accompanying drawing shows an example of the constructive embodiment according to the invention.

Figure 1:
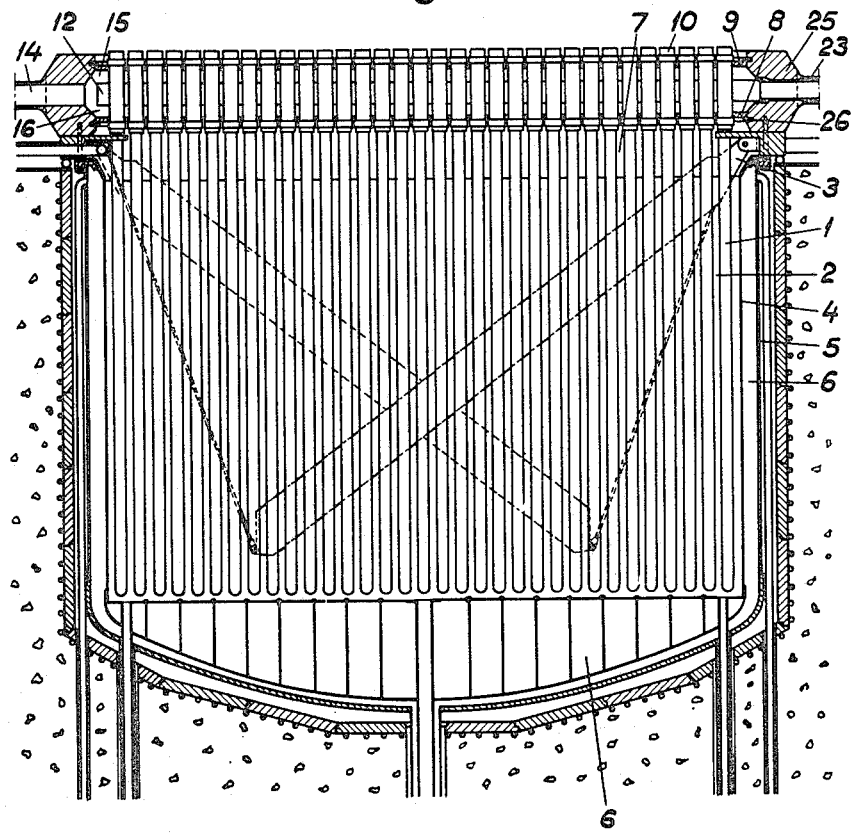
Figure 2:
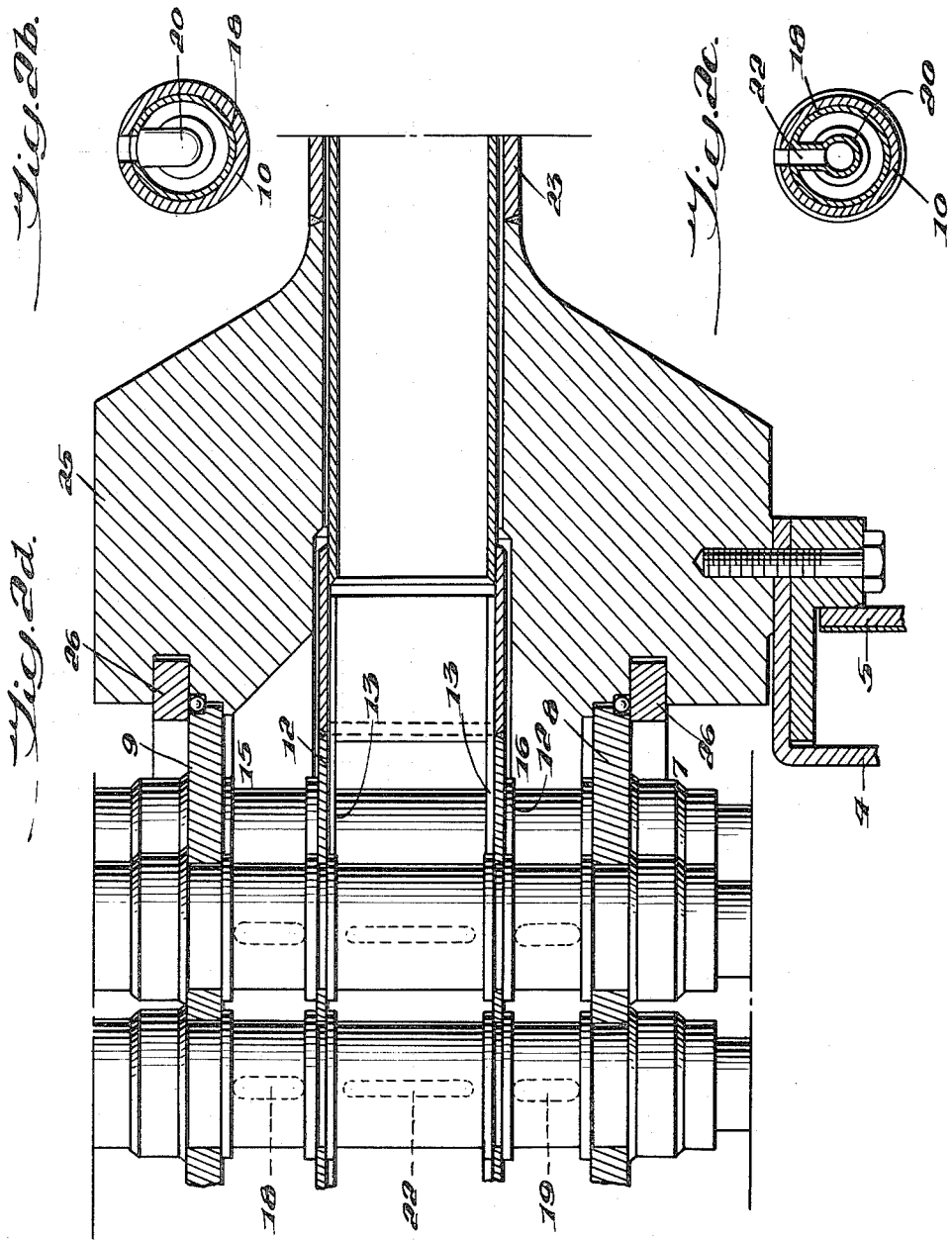
Figure 3:
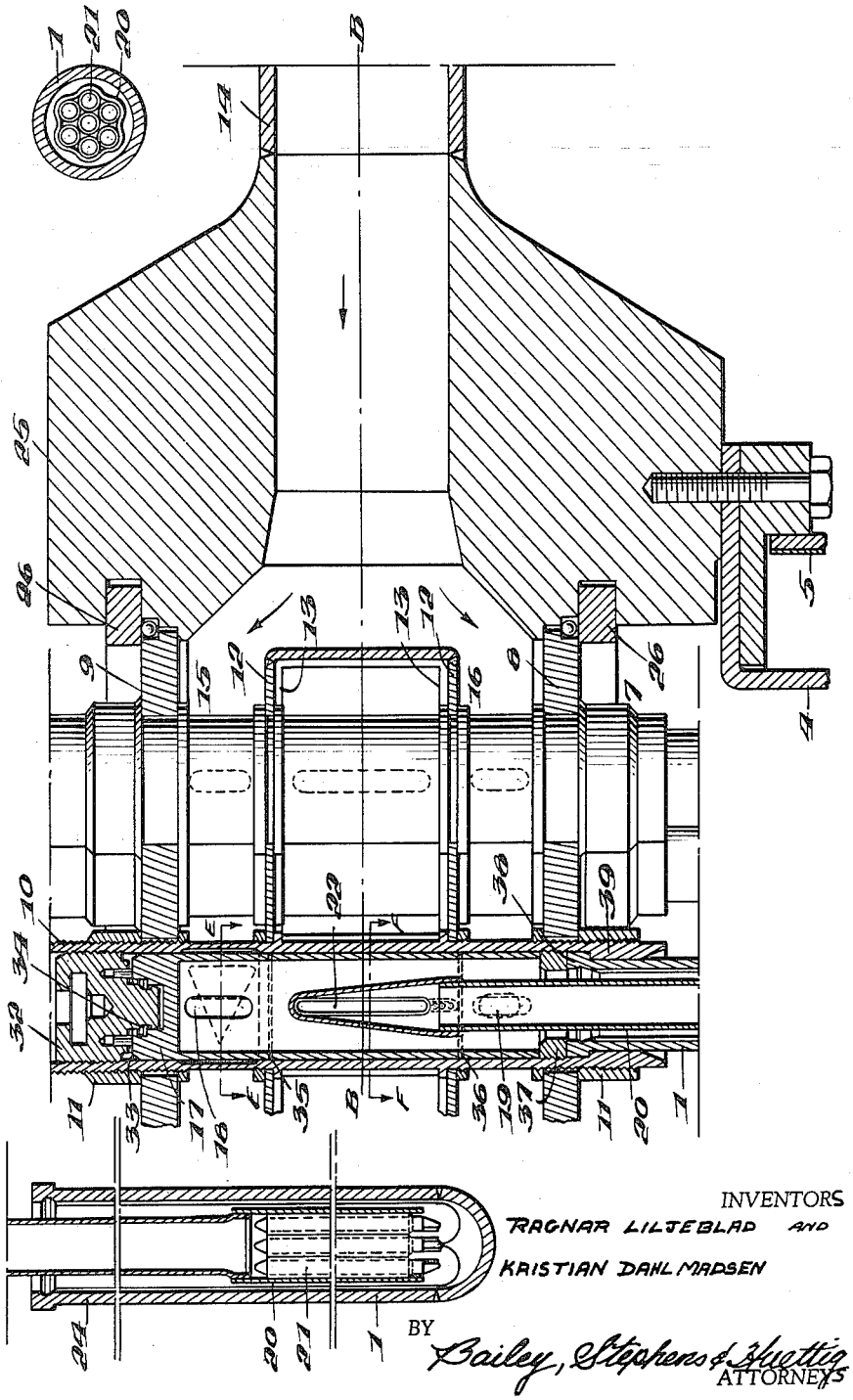
Figure 4:
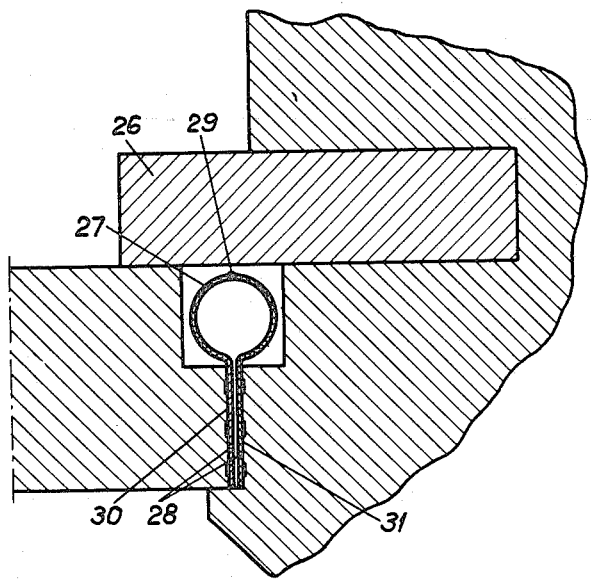
Figure 5:
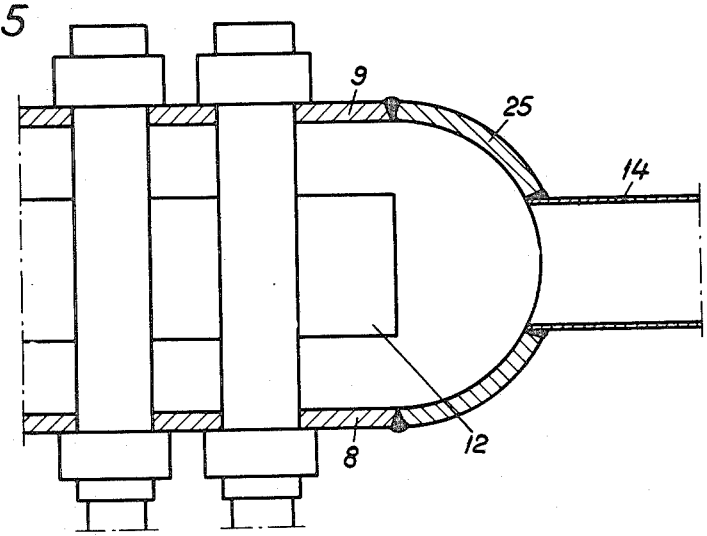

FIGURE 1 is a section through the reactor and FIG. 2a shows a detail of the distributing and collecting vessels in section along a line C—C of FIG. 6; FIGS 2b and 2c are cross-sections on the lines E—E and F—F respectively of FIG. 2a; FIG. 2d is a cross-section on the line D—D of FIG. 6. FIGURES 3a and 3b are longitudinal and horizontal cross-sections, respectively, through a pressure tube accommodating fuel elements. The FIGS. 4 and 5 show further details according to the invention and FIG. 6 is a horizontal section through a sector of the reactor taken along the line B—B in FIG. 2, level with the collecting vessel for the warm cooling medium.

The pressure tubes 1, for example of magnesium, zirconium or aluminium and the moderator water 2 preferably $D_2O$, and the control rods 3 are present in the comparatively thin-walled moderator vessel 4, of aluminium for instance. This is surrounded by a steel container 5 at such a distance that there is a space for the reflector water 6. On the free surface of the moderator water there is a gas volume 7 which is extended to the bottom plate 8 of the distributing vessel. The top plate 9 and the bottom plate 8 of the distributing vessel are held together by bushings 10 and nuts 11 welded to the plates for tightening purposes. The collecting vessel 12, having an inner heat insulating lining 13, is fixed onto these bushings. The cold cooling medium (preferably gas) enters the reactor through pipes 14 (FIG. 2a), streams in at the upper and lower parts 15, 16 of the distributing vessel, enters the head 17 of the fuel elements through openings 18 and 19 in the bushings 10 and the wall of the fuel element head 17 respectively. The cooling medium thereafter streams downwardly between the pressure tubes 1 and the fuel element tube 20 which contains, for example, seven canned fuel rods 21 and is opened downwardly so that the cooling medium is caused to stream upwardly from the bottom of 1 and to be heated by the rods 21. The heated cooling medium streams out into the collecting vessel 12 through openings 22 in the top of tube 20. From there the cooling medium streams through pipes 23 (FIG. 2d), which pipes are connected to expansion means, heat exchangers and pumps (not shown) and returns through the pipes 14.

As shown in FIGS. 3a and 3b, a thin walled tube 24 of magnesium for instance, is loosely inserted in the pressure tube 1. Between this tube 24 and the pressure tube 1, therefore, a thin layer of stagnant cooling medium is formed which acts as heat insulation between the streaming cooling medium and the moderator water.

The temperatures of the different mediums may for example be: moderator water 50–80° C., incoming cooling medium 100–200° C. and outgoing cooling medium 400–600° C. The canning 20 for the fuel elements consists of two tubes forming a space of about 1 mm. between each other. As the cooling medium is stagnant in this space it brings about a heat insulation between the warm up-streaming and the cold down-streaming cooling medium. This heat insulation is described in the U.S. patent (patent application 707,193).

On the periphery of the reactor the top plate 9 and the bottom plate 8 of the distributing vessel are joined by means of a ring shaped wall 25. For the purpose of taking up forces parallel to the axes of the bushings 10, segment members 26 are provided. The sealing between the cover 9 and the wall 25 is brought about by a split tube 27 having parallel flanges 28. The tube is suitably manufactured integrally and is bent according to the contour of the cover after which the ends of the tube are welded together so that it forms a hollow ring. Thereafter the tube is cut off along a line 29 diametrically opposed to the parallel flanges 28. The two halves of the ring tube are welded in a gas tight manner to the engaging surfaces of the cover 9 and the ring 25 respectively and are, after the cover has been mounted, welded together along the line 29. The diameter of the tube has to be so small that the tube, having for example a wall thickness of 1 mm. or less, supports the over-pressure within the vessel. The sealing means as described allows a certain displacement of the engaging surfaces 30 and 31 with respect to each other, for the purpose of reducing the radial stresses within the plates 8 and 9. It is also conceivable to manufacture the complete tube in the shape of two ring halves each having a flange, which halves are welded together along the line 29 after the flanges have been welded to the mentioned engaging surfaces. Such sealing means are also provided for sealing the bottom plate 8 against the ring 25, as will be seen from FIG. 2d. Between the head 17 of the fuel element and a sealing plug 32, there is a sealing ring 33, having wedge shaped cross-section. The head 17 and the plug 32 are held together by means of a ring 34. If a fuel element has to be changed, the plug 32 is unscrewed and removed whereat the head 17 and the fuel elements 20, 21 come out with it. The head of the fuel element is provided with piston rings 35 and 36 for the purpose of avoiding cool gas streaming from the distributing vessel in the collecting vessel, through the space between the head 17 of the fuel elements and the bushing 10. The lower end of the head of the fuel element engages a ring 37 threaded into the lower part of the bushing which ring presses a flange 38 provided on the upper end of the pressure tube 1 against an engaging surface 39 on the lower end of the bushing. When the fuel element is removed and the ring 37 is unscrewed, the pressure tube 1 may be changed.

The ring 25 may also be built as the outer half of a torus, and be welded to the plates 8 and 9 according to FIG. 5. This embodiment may be used in the case that the distance between the openings in the plates 8 and 9 is relatively great, in order to avoid too heavy radial stresses in the plates 8 and 9.

We claim as our invention:

1. In a heterogeneous nuclear pressure tube type reactor, a distributing vessel for the cooling fluid having top and bottom walls with aligned openings therethrough, said top and bottom walls having nuts welded to the outer faces thereof around said openings, bushings mounted in said openings and threaded in said nuts, a collecting vessel within the distributing vessel and spaced from the top and bottom walls thereof, said bushings passing through the collecting vessel, fuel elements having their heads in said bushings, and passage means within said bushings end baffle means within the heads of the fuel elements to conduct cooling fluid from said distributing vessel in heat exchange relation with said fuel elements and then to the collecting vessel, said collecting vessel having an internal heat-insulating lining.

2. In a reactor as claimed in claim 1, said passage means including openings in the bushing above and below the collecting vessel and within the collecting vessel.

3. In a reactor as claimed in claim 1 in which the reactor includes pressure tubes, a fuel element tube within and spaced from the pressure tubes, and containing cans which in turn contain active material within said tube, said can being open at the bottom, means securing the upper ends of the heads of the fuel elements in the bushings, said pressure tubes and bushings having aligned openings therethrough into the distributing vessel and into the collecting vessel.

4. In a reactor as claimed in claim 3, said openings into the distributing vessel being located above and below the collecting vessel.

5. In a reactor as claimed in claim 1, the periphery of the distributing vessel being built in the shape of a steel ring provided with inlet and outlet openings for the cooling medium.

6. In a reactor as claimed in claim 5, sealing means between said steel ring and the top and bottom walls, respectively, of the distributing vessel, comprising a split ring-shaped steel tube having parallel flanges along the split welded to the engaging surfaces of the top and bottom walls, respectively, and to the said ring, and locking means between said parts for preventing the top and bottom walls from axial displacement.

References Cited in the file of this patent

UNITED STATES PATENTS

| | | |
|---|---|---|
| 760,475 | Niclausse | Feb. 4, 1902 |
| 1,759,582 | Lonsdale | May 20, 1930 |
| 2,744,064 | Moore | May 1, 1956 |

OTHER REFERENCES

Proceedings of the International Conference on the Peaceful Uses of Atomic Energy Held in Geneva August 8–20, vol. III, New York, United Nations, 1955, pages 245–246, article by Dahl.

Proceedings of the International Conference on the Peaceful Uses of Atomic Energy, Geneva, August 8–20, 1955, vol. II, New York, United Nations, 1956, pp. 338 and 345, article by Yvon.